US007097898B2

(12) United States Patent
Fujisawa

(10) Patent No.: US 7,097,898 B2
(45) Date of Patent: Aug. 29, 2006

(54) PRINTED ARTICLE AND PRODUCTION METHOD OF THE SAME

(75) Inventor: Kazutoshi Fujisawa, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 10/252,121

(22) Filed: Sep. 23, 2002

(65) Prior Publication Data

US 2003/0091790 A1 May 15, 2003

(30) Foreign Application Priority Data

Sep. 21, 2001 (JP) ............................ 2001-288360
Sep. 25, 2001 (JP) ............................ 2001-290701
Sep. 27, 2001 (JP) ............................ 2001-295814
Sep. 27, 2001 (JP) ............................ 2001-295864

(51) Int. Cl.
*B32B 3/00* (2006.01)
*B32B 7/02* (2006.01)
*B41M 3/12* (2006.01)
*B05D 1/32* (2006.01)

(52) U.S. Cl. .................. 428/195.1; 428/203; 428/204; 428/212; 428/213; 428/214; 428/215; 428/220; 427/146; 427/466

(58) Field of Classification Search ............ 428/195.1, 428/203, 204, 212, 213, 214, 215, 220; 427/146, 427/466

See application file for complete search history.

(56) References Cited

U.S. PATENT DOCUMENTS

| | | | | |
|---|---|---|---|---|
| 4,708,923 | A | 11/1987 | Myers, Jr. et al. | |
| 5,441,838 | A | 8/1995 | Pane | |
| 5,908,723 | A * | 6/1999 | Malhotra et al. | 430/31 |
| 6,129,963 | A | 10/2000 | Lesko et al. | |
| 6,153,289 | A | 11/2000 | Murray | |
| 6,177,222 | B1 * | 1/2001 | McAneney et al. | 430/124 |
| 6,300,024 | B1 * | 10/2001 | Yusa et al. | 430/45 |
| 6,326,085 | B1 * | 12/2001 | McAneney et al. | 428/480 |

FOREIGN PATENT DOCUMENTS

| | | |
|---|---|---|
| JP | 61-252559 | 11/1986 |
| JP | 01-219769 | 9/1989 |
| JP | 02-009686 | 1/1990 |
| JP | 03-161760 | 7/1991 |
| JP | 04-051155 | 2/1992 |
| JP | 5-62342 | 9/1993 |
| JP | 06-059504 | 3/1994 |
| JP | 07-295291 | 11/1995 |
| JP | 07-306541 | 11/1995 |
| JP | 07-333904 | 12/1995 |
| JP | 08-027229 | 1/1996 |
| JP | 08-034172 | 2/1996 |
| JP | 08-262797 | 10/1996 |
| JP | 09-034163 | 2/1997 |
| JP | 63-123055 | 5/1998 |
| JP | 10-171149 | 6/1998 |
| JP | 10-232509 | 9/1998 |
| JP | 10-254188 | 9/1998 |
| JP | 11-007174 | 1/1999 |
| JP | 11-015301 | 1/1999 |
| JP | 11-344835 | 12/1999 |
| JP | 11-344836 | 12/1999 |
| JP | 2000-181113 | 6/2000 |
| JP | 2000-187358 | 7/2000 |
| JP | 2000-250258 | 9/2000 |
| JP | 2000-352839 | 12/2000 |
| JP | 2001-043729 | 2/2001 |
| JP | 2001-075305 | 3/2001 |
| JP | 2001-109195 | 4/2001 |
| JP | 2001-154398 | 6/2001 |
| JP | 2002-174921 | 6/2002 |

OTHER PUBLICATIONS

Japanese Abstract No. 2000 081717 dated Mar. 21, 2000.
Office Action for JP 2001-290701 (Mar. 9, 2005).
Office Action for JP 2001-288360 (Mar. 2, 2005).

* cited by examiner

*Primary Examiner*—Rena Dye
*Assistant Examiner*—Lawrence Ferguson
(74) *Attorney, Agent, or Firm*—Sughrue Mion, PLLC

(57) ABSTRACT

A printed article of the present invention is a printed article comprising: a substrate; (1) a toner image which is made of a thermoplastic resin containing wax component in an amount of 3 to 15 wt %, has a surface gloss level of 5–40, and is formed on the substrate by oilless fusing or (2) a toner image which is made of a thermoplastic resin containing wax component in an amount from 3 to 15 wt % and is formed on the substrate by oilless fusing to have a surface gloss level of 25–45 and have a flat surface with a lot of concavities; and a transparent film which is laminated to the surface of the substrate, on which the toner image is formed, via an adhesive layer. The toner image not projected is easy to see (read) because of no shin. The projected image of the toner image is also excellent both in visibility and transparency. That is, the printed article is useful as a printed article for OHP. The printed article is also useful as a high gloss printed article because the toner image has a gloss level corresponding to the gloss level of a non-transparent sheet so as to exhibit good color saturation.

12 Claims, 3 Drawing Sheets

PRINTED ARTICLE AND PRODUCTION METHOD OF THE SAME

BACKGROUND OF THE INVENTION

The present invention relates to a printed article which is useful as a printed article for OHP or a high gloss printed article, of which a toner image is formed by electrophotography, and to a production method of the same.

In a conventional image forming apparatus, a photoreceptor as a latent image carrier such as a photosensitive drum or a photosensitive belt is rotatably supported to the main body of the image forming apparatus. During the image forming operation, a latent image is formed onto a photosensitive layer of the photoreceptor and, after that, is developed with toner particles to form a visible image. Then, the visible image is transferred to a receiving medium. For transferring the visible image, there is a known method of directly transferring the visible image to the receiving medium by using a corona transfer or a transfer roller and another known method of first transferring the visible image to an intermediate transfer member such as a transfer drum or a transfer belt and then transferring it to the receiving medium.

Such methods are employed in monochrome image forming apparatuses. In addition, for a full-color image forming apparatus having a plurality of photoreceptors and developing devices, there is a known method transferring a plurality of color images on a transfer belt or a transfer drum to a receiving medium such as a paper in such a manner that the respective color images are sequentially superposed on each other, and then fixing these images. The apparatuses according to such a method using a belt are categorized as a tandem type, while the apparatuses according to such a method using a drum are categorized as a transfer drum type. Moreover, an intermediate transferring type is also known in which respective unicolor images are sequentially primary-transferred to an intermediate transfer member and the primary-transferred images are secondary-transferred to a receiving medium such as a paper at once.

Recently, transparent substrates are used as receiving media and light transmitting images are formed on such transparent substrates for projecting images on a screen using an overhead projector (OHP). Attempts have been made to form light transmitting images on transparent substrates by the electrophotography to produce such a printed article for OHP. In practice, however, there is a problem that a projected image of such a printed article for OHP is not clear because of low transparency of a toner image of the printed article and another problem that desired colors is not exactly reproduced in the image projected on the screen such that the tone of projected image is darkened compared to the tone of the toner image on the printed article for OHP. This is because the irregularity of outer surface of a toner image makes scattering or irregular reflection of lights to reduce the transmission of lights on the images so that sufficient quantity of light hardly reaches the projecting screen. This is one of the factors reducing the visibility and the transparency of the projected image. The reduction in visibility and transparency is a phenomenon exhibited particularly on a printed article for OHP using two or more colors.

Japanese Patent Publication No. H05-62342 is directed to solve the aforementioned problems and discloses that the surface roughness of a toner image is smoothed by coating the surface of the toner image with a transparent lacquer, attaching a transparent adhesive tape on the surface of the toner image, or applying heat or pressure to change the shapes of toner particles. From the description in this publication that heat or pressure is applied to the toner image for smoothing the roughness of the surface, it is found that the toner particles must be flexible and have high fluidity during fixing process. In order to prevent "filming phenomenon" of such toner particles onto a fixing roller, the fixing roller is lubricated with oil to have a resistance against toner offset at high temperature. As the fixing roller is lubricated with oil, however, the adhesive property of the transparent adhesive tape is affected so as to produce floating of a toner image in the long run, resulting in reduction in visibility and transparency of the projected image. With a toner image which is flexible and has high fluidity, a fixing roller used must have a soft outer layer for smoothing the surface of the toner image. Such fixing roller can envelope entirely the toner image when touching and thus can evenly apply thermal energy to the toner image. However, the soft fixing roller has poor durability and poor heat conductivity, so the soft fixing roller is unsuited for mass high-speed printing. In addition, when the surfaces of flexible toner particles are smoothed by applying heat or pressure, "shine" is produced on toner image. The shine makes reading of characters difficult.

On the other hand, with oilless fusing toner which can eliminate the necessity of using oil for coating the fixing roller, the filming phenomenon of toner particles to the fixing roller is prevented and resistance against toner offset at high temperature is obtained. However, the amount of wax in the toner particles is large so that the transparency is affected by solidifying property of wax, thus affecting projected images.

Besides the printed articles for OHP, attempts have been made to form an image on a non-transparent sheet with gloss as a receiving medium by employing the electrophotography to produce a high gloss printed article. Also in this case, the irregularity of outer surface of a toner image makes scattering or irregular reflection of lights to reduce the reflection of lights on the images, thus increasing difference in gloss level between the gloss level of the image and the non-transparent sheet. Such increased difference in gloss level is defects of high gloss printed articles.

In case of using oilless fusing toner, a process is taken for reducing the fluidity during fixing. The process may comprise increasing the amount of wax in toner particles or adding cross-linking component to a resin as a thermoplastic resin. The surface of the toner image after fixed includes a solidified lump of wax and has increased irregularity because the toner image is hard, thus increasing difference in gloss level between the image and the non-transparent sheet. That is, there is the same problem in case of using oilless fusing toner. The increased difference in gloss level is a phenomenon exhibited particularly on a high gloss printed article using two or more colors and only permits the production of printed articles having poor color saturation.

The first object of the present invention is to provide a printed article suitable for OHP of which a toner image is easily read and a projected image has excellent visibility and transparency and to provide a production method of the same.

The second object of the present invention is to provide a printed article suitable as a high gloss printed article of which a toner image has a gloss level nearly equal to that on a non-transparent sheet and having improved color saturation and to provide a production method of the same.

SUMMARY OF THE INVENTION

A first printed article of the present invention is characterized by comprising: a substrate; a toner image which is made of a thermoplastic resin containing wax component in an amount of 3 to 15 wt %, has a surface gloss level from 5 to 40, and is formed on the substrate by oilless fusing; and a transparent film which is laminated to the surface of the substrate, on which the toner image is formed, via an adhesive layer.

The first printed article is characterized in that the 10-Point mean roughness (Rz) according to JISB0601-1982 of the surface of the toner image is in a range from 3 to 10 μm.

A second printed article of the present invention is characterized by comprising: a substrate; a toner image which is made of a thermoplastic resin containing wax component in an amount from 3 to 15 wt % and is formed on the substrate by oilless fusing to have a surface gloss level from 25 to 45 and have a flat surface with a lot of concavities; and a transparent film which is laminated to the surface of the substrate, on which the toner image is formed, via an adhesive layer.

The second printed article is characterized in that the 10-Point mean roughness (Rz) according to JISB0601-1982 of the surface of the toner image is in a range from 1 to 10 μm.

The first or second printed article of the present invention is characterized in that the thermoplastic resin of the toner image is polyester resin which contains THF-insoluble matter in an amount from 2 to 40 wt %.

The first or second printed article of the present invention is characterized in that the thermoplastic resin of the toner image is a styrene-(meth)acryl copolymer resin which contains crosslinking component in an amount from 40 to 60 wt %.

The first or second printed article of the present invention is characterized in that toner particles forming the toner image are composed of toner mother particles and external additive particles and wherein the external additive particles are added to the toner mother particles by a ratio from 2 to 7 wt %.

The first or second printed article of the present invention is characterized in that the thickness of the adhesive layer is larger than the thickness of the toner image.

The first or second printed article of the present invention is characterized in that the substrate is a transparent substrate, the toner image is a toner image having light transmitting property, and the printed article is a printed article for OHP.

The first or second printed article of the present invention is characterized in that the substrate is a non-transparent sheet, the toner image is a toner image having light transmitting property, and the printed article is a high gloss printed article.

A production method of the first printed article is characterized by comprising steps of: forming a toner image, made of a thermoplastic resin toner containing wax component in an amount from 3 to 15 wt % and having a surface gloss level from 5 to 40, by oilless fusing; and attaching a transparent adhesive sheet, composed of a transparent film and an adhesive layer formed thereon, to the surface of the substrate, on which the toner image is formed, in such a manner that the adhesive layer adheres to the substrate.

A production method of the second printed article is characterized by comprising steps of: forming a toner image, made of a thermoplastic resin toner containing wax component in an amount from 3 to 15 wt %, having a surface gloss level from 25 to 45, and having a flat surface with a lot of concavities, by oilless fusing; and attaching a transparent adhesive sheet, composed of a transparent film and an adhesive layer formed thereon, to the surface of the substrate, on which the toner image is formed, in such a manner that the adhesive layer adheres to the substrate.

In this specification, numerical range will be sometimes expressed without the former unit. For example the expression of "3–15 wt %" or "from 3 to 15 wt %" means "3 wt % to 15 wt %. In addition, "styrene-(meth)acryl copolymer resin" includes styrene-acrylic ester resin and styrene-methacrylic ester resin.

When the first or second printed article of the present invention is produced as a printed article for OHP using a transparent substrate as the substrate, the printed article is easy to see (read) because of no shine. In addition, a projected image of a toner image on the printed article is excellent both in visibility and transparency. When first or second printed article of the present invention is produced as a high gloss printed article using a non-transparent sheet as the substrate, the gloss level of a toner image on the printed article is set to correspond to the gloss level of the non-transparent sheet and the high gloss printed article has high color saturation. The first and second printed articles of the present invention are not deteriorated in its gloss level for a long period of time.

DESCRIPTION OF THE PREFERRED EMBODIMENTS

Figure 1:
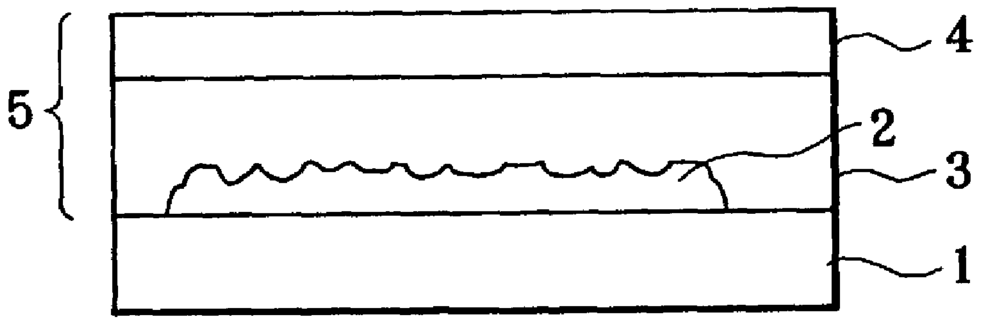
FIG. 1 is a schematic sectional view for explaining an example of the first printed article of the present invention which is produced as a printed article for OHP using a transparent substrate.

The first printed article of the present invention comprises a substrate 1, a toner image 2 which is made of a thermoplastic resin containing wax component of 3–15 wt % and having a surface gloss level of 5–40, and is formed on the substrate by oilless fusing, and a transparent film 4 which is superposed on the toner image via an adhesive layer 3 as shown in FIG. 1.

Figure 2:
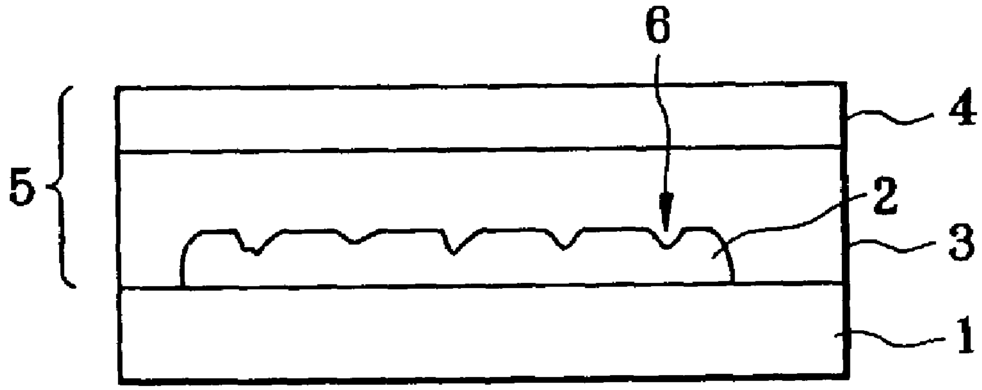
FIG. 2 is a schematic sectional view for explaining an example of the second printed article of the present invention which is produced as a printed article for OHP using a transparent substrate.

The second printed article of the present invention has a toner image fixed by using a fixing roller having a surface hardness of Asker C 80° or more and, as shown in FIG. 2, comprises a substrate 1, the toner image 2 which is formed on the substrate with a thermoplastic resin containing wax component of 3–15 wt % and having a surface gloss level of 25–45 by oilless fusing, and a transparent film 4 which is superposed on the toner image via an adhesive layer 3.

By using a transparent substrate as the substrate 1 and making the toner image to be a light transmitting toner image, either of the first and second printed articles of the present invention may be a printed article suitable for use in OHP. In addition, by using a non-transparent sheet as the substrate 1 and making the toner image to be a light transmitting toner image, either of the first and second printed articles may be a high gloss printed article.

The transparent substrate is required to have such a heat resistance that the transparent substrate is not deformed by heat at a toner fixing temperature of a fixing device and is preferably a plastic film having flat surface and a light transmitting property. Examples of such plastic film include non-oriented polyethylene terephthalate films, polyester films, polycarbonate films, polyamidimide films. The film thickness of the transparent substrate is in a range from 50 to 200 μm, preferably from 70 to 120 μm. The transparent substrate may be "CG3710" or "PP2260" available from Sumitomo 3M Ltd. or "27060" available from A-one Co., Ltd.

The non-transparent sheet is also required to have such a heat resistance that the non-transparent sheet is not deformed by heat at a toner fixing temperature of a fixing device. Examples include art paper, coated paper, light weight coat paper, cast-coated paper, and synthetic paper made by the inner paper forming method, the surface coating method, or the surface treatment method, having surface smoothness of surface gloss level of 5–20. The non-transparent sheet may be "DJ paper" or "J paper" available from Xerox Co., Ltd. or "My paper" or "type 6200 paper" available from NBS Ricoh Co., Ltd.

Toner for forming the light transmitting toner image in the present invention is an oilless fusing toner which is fixed by using an oilless fusing device. The toner comprises mother particles made of a thermoplastic resin binder, a coloring agent, and a wax, and additives such as a charge controlling agent which is internally or externally added to the mother particles as necessary, a fluidity improving agent and gloss controlling agent which are externally added to the mother particles.

Examples of the thermoplastic resin binder include polyester resins, styrene-(meth)acrylic ester resins, epoxy resins, styrene-buthaziene copolymers. These resins may be used alone or in blended state. Among them, polyester resin or styrene-(meth)acrylic ester resin is particularly preferably used alone or in blended state.

The polyester resin may be a polyester resin which is prepared by polycondensating dihydric alcohol component and dihydric acid component and using trihydric or more alcohol component and acid component together for crosslinkage.

Examples of dihydric alcohol component include ethylene glycol, propylene glycol, 1,4-butanediol, 1,3-butanediol, diethylene glycol, dipropylene glycol, triethylene glycol, 1,5-pentanediol, 1,6-pentanediol, neopentyl glycol, hydrobisphenol A, polyoxyethylene-bisphenol A, and polyoxyplopylene-bisphenol A. Example of dihydric acid component include unsaturated dibasic acids such as maleic acid, maleic anhydride, fumaric acid, citraconic acid, and itaconic acid, and saturated dibasic acids such as, tetrachlorophthalic anhydride, HET acid, tetrabromophthalic anhydride, phthalic anhydride, isophthalic acid, telephthalic acid, endomethylene tetrahydrophthalic anhydride, tetrahydrophthalic anhydride, hexahydrophthalic anhydride, succinic acid, adipic acid, azelaic acid, and sebacic acid. These dihydric acid components may be used alone or in blended state.

Examples of trihydric or more alcohol component as a crosslinking component include polyhydric alcohols such as glycerin, sorbitol, 1,2,3,6-hexanetetrol, 1,4-sorbitan, pentaerythritol, dipentaerythritol, tripentaerythritol, 1,2,4-buthantriol, 1,2,5-penthantriol, 2-methylpropanetriol, 2-methyl-1,2,4-buthantriol, trimethylolethane, trimethylolpropane, and 1,3,5-trihydroxybenzene. Examples of trihydric or more acid component include trimellitic acid, piromellitic acid, 1,2,4-benzenetricarboxylic acid, 1,2,5-benzenetricarboxylic acid, 2,5,7-naphthalenetricarboxylic acid, 1,2,4-buthanetricarboxylic acid, 1,2,5-hexanetricarboxylic acid, 1,3-dicarboxyl-2-methyl-2-methlenecarboxypropane, tetra(methylenecarboxyl)methane, 1,2,7,8-octanetetracarboxylic acid, and enball trimer acid, and anhydrides of the above components. These acid components may be used alone or in blended state.

It is important for the polyester resin to contain a crosslinking component. The polyester resin contains a THF-insoluble matter by 2–40 wt %, preferably 5–20 wt %. When the THF-insoluble matter is less than 2 wt %, the surface roughness of the toner image is eliminated during fixing process so that toner particles are hardly separated from the fixing roll, and "shine" is created on the output toner image so that it is hard to read. When the THF-insoluble matter exceeds 40 wt %, the toner is hardly fused, making the high-speed fixing difficult, and the dispersibility of additives in toner mother particles is deteriorated.

The ratio (%) of THF-insoluble matter in the entire resin is obtained as follows. A sample of the resin in an amount of 0.5 g is put in a cylindrical filter paper and set on a Soxhlet extractor. Extraction is carried out for 12 hours with THF (tetrahydrofuran) as a solvent. A THF-insoluble matter remaining on the cylindrical filter paper is measured and the ratio of the THF-insoluble matter relative to the entire resin is calculated.

The polyester resin has a softening point from 90 to 150° C., preferably from 100 to 130° C., a glass-transition temperature from 50 to 70° C., preferably from 55 to 65° C., a number average molecular weight from 1,000 to 50,000, preferably from 1,500 to 3,500, and a weight average molecular weight from 15,000 to 35,000.

The softening point and the glass-transition temperature are values measured by "DSC120" available from Seiko Instruments Inc. The molecular weights are values measured by GPC (gel permeation chromatography) as converted into polystyrene.

The styrene-(meth)acrylic ester resin is obtained by polymerizing a monomer of styrene series and a monomer of (meth)acrylic ester series with a crosslinkable monomer.

Examples of monomer of styrene series include: styrene, o-methylstyrene, m-methylstyrene, p-methylstyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene.

Examples of monomer of (meth)acrylic ester series include methyl (meth)acrylate, ethyl (meth)acrylate, propyl (meth)acrylate, n-butyl (meth)acrylate, isobutyl (meth)acrylate, n-octyl (meth)acrylate, dodecyl (meth)acrylate, 2-ethylhexyl (meth)acrylate, and stearyl (meth)acrylate.

Examples of crosslinkable monomer include divinylbenzene, divinylnaphthalene, di(meth)acrylate compounds attached by alkyl chains such as ethylene glycol diacrylate, di(meth)acrylate compounds attached by alkyl chains including ether linkage such as diethylene glycol diacrylate, di(meth)acrylate compounds attached by chains including aromatic group and ether linkage such as polyoxyethylene (2)-2,2-bis(4-hydroxyphenyl)propane diacrylate, di(meth) acrylate compounds of polyester type, multifunctional compounds such as pentaerythritol triacrylate, triallyl cyanurate, and triallyl trimerytate.

It is important for the styrene-(meth)acrylic ester resin to contain a crosslinking component. The styrene-(meth) acrylic ester resin contains crosslinking component by 40–60 wt %, preferably 45–55 wt %. When the crosslinking component is less than 40 wt %, the surface roughness of the toner image is eliminated during fixing process and "shine" is created on the output toner image so that it is hard to read. When the crosslinking component exceeds 60 wt %, the toner is hardly melted, making the high-speed fixing difficult, and the dispersibility of additives in toner mother particles is deteriorated. The rate of the crosslinking component in the styrene-(meth)acrylic ester resin is measured by the identification of THF-insoluble matter amount.

The styrene-(meth)acrylate resin has a softening point from 90 to 150° C., preferably from 100 to 130° C., a glass-transition temperature from 45 to 75° C., preferably from 50 to 65° C., a number average molecular weight from 1,000 to 150,000, preferably from 2,000 to 10,000, and a weight average molecular weight from 30,000 to 250,000, preferably from 50,000 to 100,000. The softening point, the glass-transition temperature, and the molecular weights are measured in the same manners as those of the polyester resin.

These thermoplastic resin binders are contained in the toner mother particles by 80–95 wt %, preferably 85–93 wt %.

As the coloring agent in the light transmitting toner, pigments and dyes of various types and of various colors may be used. Examples of yellow pigments are C.I. 10316 (Naphthol Yellow S), C.I. 11710 (Hansa Yellow 10G), C.I. 11660 (Hansa Yellow 5G), C.I. 11670 (Hansa Yellow 3G), C.I. 11680 (Hansa Yellow G), C.I. 11730 (Hansa Yellow GR), C.I. 11735 (Hansa Yellow A), C.I. 11740 (Hansa Yellow NR), C.I. 12710 (Hansa Yellow R), C.I 12720 (Pigment Yellow L), C.I. 21090 (Benzidine Yellow), C.I. 21095 (Benzidine Yellow G), C.I. 21100 (Benzidine Yellow GR), C.I. 2040 (Permanent Yellow NCG), C.I. 21220 (Vulcan Fast Yellow 5), and C.I. 21135 (Vulcan Fast Yellow R). Examples of red pigments are C.I. 12055 (Sudan I), C.I. 21220 (Permanent Orange), C.I. 12175 (Lithol Fast Orange 3GL), C.I. 12305 (Permanent Orange GTR), C.I. 11725 (Hansa Orange), C.I. 21165 (Vulcan Fast Orange GG), C.I. 21110 (Benzidine Orange G), C.I. 12120 (Permanent Red 4R), C.I. 1270 (Para Red), C.I. 12085 (Fire Red), C.I. 12315 (Brilliant Fast Scarlet), C.I. 12310 (Permanent Red F2R), C.I. 12335 (Permanent Red F4R), C.I. 12440 (Permanent Red FRL), C.I. 12460 (Permanent Red FRLL), C.I. 12420 (Permanent Red F4RH), C.I. 12450 (Light Fast Red Toner B), C.I. 12490 (Permanent Carmine FB), and C.I. 15850 (Brilliant Carmine 6B). Examples of blue pigments are C.I. 74100 (Metal-free Phthalocyanine Blue), C.I. 74160 (Phthalocyanine Blue), and C.I. 74180 (Fast Sky Blue). For the purpose of obtaining light transmittancy of obtained toner images, it is preferable that the particle size of the coloring agent is ½ or less of wavelength of visible radiation.

The coloring agents may be used alone or in combination. The ratio of the coloring agent contained in the toner mother particles is 3–6 wt %, preferably 4–5 wt %. When the coloring agent exceeds 6 wt %, the fixing property and transparency of the toner is reduced. When the coloring agent is less than 3 wt %, any desired image density may not be obtained.

As for waxes dispersed in the toner, specific examples are paraffin wax, polyolefine wax, modified wax having aromatic group, hydrocarbon compounds having alicyclic group, natural wax, long-chain carboxylic acid having a hydrocarbon long chain with at least 12 carbon atoms [carbon chains of fatty series: $CH_3(CH_2)11$ or $CH_3(CH_2)1_2$ or more], their esters, metal salts of fatty acids, fatty acid amides, and fatty acid bisamides. These may be used alone or in combination.

The waxes have a softening point (fusing point), as the endothermic main peak value on a DSC endothermic curve measured by "DSC120" available from Seiko Instruments Inc., in a range from 40 to 130° C., preferably from 50 to 120° C. When the softening point is less than 40° C., the obtained toner has poor blocking resistance and poor shape-maintaining property. When the softening point exceeds 130° C., the obtained toner has poor effect of reducing the fixing temperature or fixing pressure.

Polyolefine waxes such as polypropylene waxes have high crystallizing property so that a toner containing polyolefine wax has excellent resistance against toner offset at high temperature. When the toner containing polyolefine wax is used for a printed article for OHP, however, the high crystallizing property reduces the transparency of the projected image. When the toner containing polyolefine wax is used for a high gloss printed article, the high crystallizing property reduces the reflecting property and coloring property. Ester waxes having at least one hydrocarbon long chain with at least 12 carbon atoms are preferable because a toner containing the ester waxes have excellent resistance against toner offset at high temperature without reducing the transparency of the light-transmitting toner image.

The ratio of wax contained in the toner mother particles is 3–15 wt %, preferably 3–8 wt %, more preferably 5–7 wt %. When the ratio of the wax is less than 3 wt %, the resistance against toner offset at high temperature becomes poor for an oilless fusing toner. When the ratio of the wax exceeds 15 wt %, the transparency of toner image is poor for a printed article for OHP or a high gloss printed article and particle-to-particle fusion of toner is caused.

Oilless fusing toner contains a large amount of wax so that wax components are deposited during fixing process to form spaces due to crystallized particles. This causes problems of roughening the surface of toner images and increasing the haze value of obtained images. In the present invention, however, the roughness of the surface is coated with adhesives to flatten the surface, thereby preventing scattering of light due to the roughness of the surface of toner image and thus increasing the light transmitting efficiency.

Charge control agent to be used is not particularly limited. Any of charge control agents which can be internally or externally added to toner mother particles to triboelectrically apply positive or negative charge may be used and the charge control agent may be organic or inorganic type.

Specific examples of positive charge control agent are Nigrosine Base EX (available from Orient Chemical Industries, LTD.), Quaternary ammonium salts P-51 (available from Orient Chemical Industries, LTD.), Nigrosine Bontron N-01 (available from Orient Chemical Industries, LTD.), Sudan Chief Schwarz BB (Solvent Black 3: Color Index 26150), Fet Schwarz HBN (C.I. No. 26150), Brilliant Spilit Schwarz TN (Farben Farbriken Bayer GmbH), Zabon Schwarz X (Farberk Hoechst GmbH) and, in addition, alkoxyamine, alkyl amide, chelate molybdate pigment. Among them, Quaternary ammonium salts P-51 is preferable.

Specific examples of negative charge control agent are Oil Black (Color Index 26150), Oil Black BY (available from Orient Chemical Industries, LTD.), Bontron S-22 (available from Orient Chemical Industries, LTD.), metal complex compounds of salicylic acid E-81 (available from Orient Chemical Industries, LTD.), thioindigo type pigments, sulfonyl amine derivatives of copper phthalocyanine, Spilon Black TRH (available from Hodogaya Chemical Co., Ltd.), Bontron S-34 (available from Orient Chemical Industries, LTD.), Nigrosine SO (available from Orient Chemical Industries, LTD.), Ceres Schwarz (R) G (Farben Farbriken Bayer GmbH), Chromogene Schwarz ETOO (C.I. No. 14645), and Azo Oil Black (R) (National Aniline & Chemical Co.). Among them, the metal complex compounds of salicylic acid E-81 is preferable. These charge controlling agents may be used alone or in combination. The charge controlling agent may be contained in toner mother particles or externally added to toner mother particles by 0.5–3 wt %. Further, additives such as magnetic particles and dispersing agent may be suitably added to the toner mother particles.

As for the oilless fusing toner of the present invention, it is preferable to externally add a fluidity improving agent and/or a gloss controlling agent for toner images as external additives to the toner mother particles.

Examples of fluidity improving agent are fine particles of metal salts of fatty acid such as zinc stearate, calcium stearate, lead stearate, fine particles of metallic oxides such as ion oxide, aluminum oxide, titanium oxide, zinc oxide, and fine particles of silica such as wet-process silica or dry-process silica or treated silica particles of which surfaces are processed with a silane coupling agent, a titanate coupling agent, and silicone oil. These fluidity improving agents can be used alone or in blended state. The particle size (primary mean particle diameter) of the fluidity improving agent is in a range from 0.001 μm to 2 μm, preferably from 0.002 μm to 0.2 μm.

The adding amount of the fluidity improving agent is from 2 to 5 wt %, preferably from 2 to 3.5 wt % relative to the toner mother particles. With the fluidity improving agent less than 2 wt %, the effect of improving the fluidity can not be exhibited. With the fluidity improving agent exceeding 5 wt %, fog, spread of characters, and/or scattering within the apparatus are facilitated.

In the toner of the present invention, components which are not melted at the heating temperature of the fixing device are positively contained in the binder resin. In case of a polyester resin, THF-insoluble matter is contained. In case of a styrene-(meth)acrylic ester resin, crosslinking component is contained. In addition, a gross controlling agent is externally added to the toner mother particles in such a manner as to set the gloss level of the surface of light transmitting toner image formed with the toner to be in a range from 5 to 40 for the first printed article and in a range from 25 to 45 for the second printed article.

Preferable examples of the gloss controlling agent are fine particles of polyester resins such as polymethyl methacrylate, fine particles of fluorine resins such as vinylidene fluoride and polytetrafluoroethylene, and fine particles of acrylic resin. The particle size (primary mean particle diameter) of the gloss controlling agent is in a range from 0.05 μm to 0.3 μm, preferably from 0.1 μm to 0.2 μm.

The gloss controlling agent is added in such an amount of that the entire amount of external additives including the aforementioned fluidity improving agent is from 2 to 5.5 wt %, preferably from 2.5 to 3.5 wt % relative to the toner mother particles.

The oilless fusing toner of the present invention is prepared as follows. A thermoplastic resin binder and additives such as a coloring agent, waxes, and a charge controlling agent are put into a Henschel Mixer 20B (available from Mitsui Mining Co., Ltd.) in respective suitable amounts and are uniformly mixed. After that, the mixture is melt and kneaded by using a twin-shaft extruder (PCM-30 available from Ikegai Corporation) to disperse and fix the additives in the binder resin.

Then, the substance is roughly pulverized into pieces having controlled grain size and, after that, pulverized into fine particles in an impact pulverizing manner with jet air using a jet mill "200AFG" (available from Hosokawa Micron Corporation) or "IDS-2" (available from Nippon Pneumatic Mfg. Co., Ltd.) such that the obtained fine particles have a mean particle diameter from 1 μm to 8 μm. The fine particles were classified by an air classifier "100ATP" (available from Hosokawa Micron Corporation), "DSX-2" (available from Nippon Pneumatic Mfg. Co., Ltd.), or "Elbow-jet" (Nittetsu Mining Co., Ltd. in order to remove fine powder to make the particle-size distribution sharp. The unicolor particles obtained by the above classifying process have a degree of circularity from 0.70 to 0.92. Subsequently, the obtained unicolor particles and external additives such as a fluidity improving agent and a gloss controlling agent are put into the Henschel Mixer 20B (available from Mitsui Mining Co., Ltd.) in respective suitable amounts and are uniformly mixed, thereby obtaining the oilless fusing toner of the present invention.

The pulverized toner obtained in the above manner has a mean particle diameter of 5 μm to 10 μm, preferably from 6 μm to 9 μm. The particle size of the toner particles is a mean particle diameter based on the volume measured in the coulter method ("Coulter Multi sizer III" available from Beckman Coulter, Inc.).

Now an image forming apparatus with a rotary type developing unit will be described as an example of the image forming apparatus to which the oilless fusing toner of the present invention is adopted.

Figure 5:
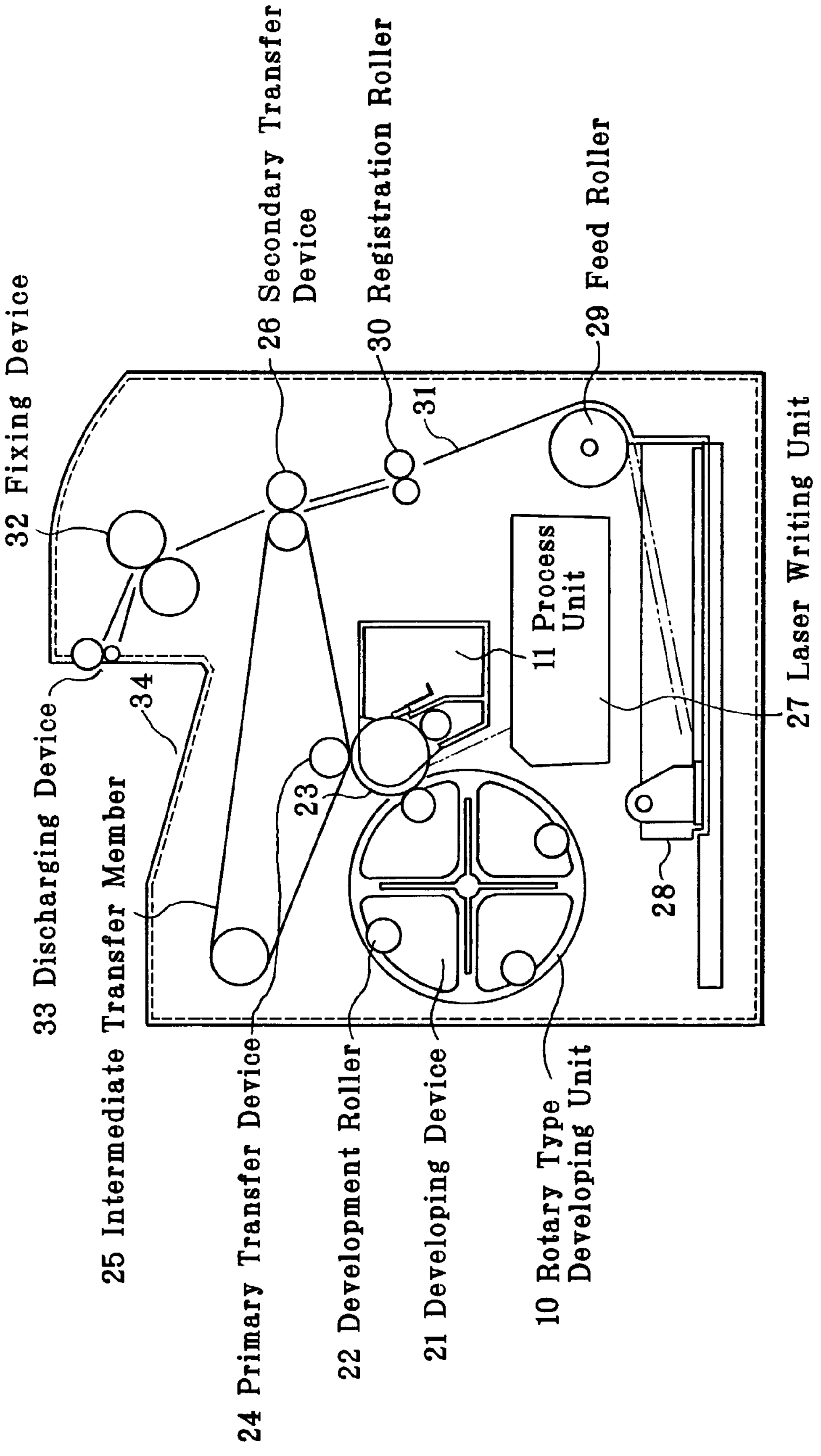
FIG. 5 is a schematic sectional view for explaining an example of an image forming apparatus used for producing the printed articles of the present invention.

FIG. 5 is a schematic illustration of the image forming apparatus. In FIG. 5, numeral 10 designates a rotary type developing unit, 11 designates a process unit, 21 designates a developing device, 22 designates a development roller, 23 designates a photoreceptor, 24 designates a primary transfer device, 25 designates an intermediate transfer member, 26 designates a secondary transfer device, 27 designates a laser writing unit, 28 designates a feed tray, 29 designates a feed roller, 30 designates a registration roller, 31 designates a feed path, 32 designates a fixing device, 33 designates a discharging device, and 34 designates an output sheet tray.

In the image forming apparatus according to the present invention, as shown in FIG. 5, disposed around the photoreceptor 23 as the latent image carrier of the process unit 11 along its rotational direction are a charging device for uniformly charging the photoreceptor 23, the laser writing unit 27 for forming an electrostatic latent image on the photoreceptor 23, the rotary type developing unit 10 for developing the electrostatic latent image, the intermediate transfer member 25 for transferring a unicolor toner image formed on the photoreceptor 23, and the primary transfer device 24. The photoreceptor 23 has a cylindrical conductive substrate having a thin wall and a photosensitive layer formed on the conductive substrate. A receiving medium (a transparent substrate or a non-transparent sheet) is carried from the feed tray 28 to the secondary transfer device 26 via the feed roller 29 and the registration roller 30. At the secondary transfer device 26, a full-color toner image consisting of four color toner images is transferred to the receiving medium. The fixing device 32 for fixing toner images and the discharging device 33 are arranged along a path through which the receiving medium with the transferred full-color toner is carried to the output sheet tray 34.

The rotary type developing unit 10 comprises four developing devices 21 for yellow Y, cyan C, magenta M, and black K. Every one revolution of the photoreceptor 23, the development roller 22 as the developer carrier of one of the developing devices 21 can be selectively brought in contact with the photoreceptor 23. A toner cartridge in which toner is hosed is connected to each developing device 21 in order to supply the toner.

An image forming signal is inputted from a computer (not shown), the photoreceptor 23, the development rollers 22 of the rotary type developing unit 10, and the intermediate transfer member 25 are driven to rotate. First, the outer surface of the photoreceptor 23 is uniformly charged by the charging device. Then, the outer surface of the photoreceptor 23 is exposed to selective light corresponding to image information for a first color, e.g. yellow, by the laser writing unit 27, thereby forming an electrostatic latent image for yellow on the photoreceptor 23. At this point, the rotary type developing unit 10 is rotated to bring the development roller 22 of the developing device for yellow in contact with the photoreceptor 23, thereby developing the electrostatic latent image of yellow to form a toner image of yellow on the photoreceptor 23. After that, a primary transfer voltage of a polarity opposite to the polarity of the toner is applied to the first transfer device 24, thereby transferring the toner image formed on the photoreceptor 23 to the intermediate transfer member 25. During this, the secondary transfer device 26 is spaced apart from the intermediate transfer member 25.

The above processes are repeated according to image forming signals for the second color, the third color, and the fourth color. The unicolor toner images corresponding to the respective image forming signals are superposed on each other on the intermediate transfer member 25 so as to form a full-color toner image. A receiving medium is fed to the secondary transfer device 26 through the feed path 31 and the registration roller 30 at such a predetermined timing that the full-color toner image reaches the secondary transfer device 26. The secondary transfer device 26 is pressed against the intermediate transfer member 25 and a secondary transfer voltage is applied to the secondary transfer device 26, thereby transferring the full-color toner image on the intermediate transfer member 25 to the receiving medium. The full-color toner image transferred to the receiving medium is fixed with heat and pressure by the fixing device 32.

Though the image forming apparatus is a full-color electrophotographic printer capable of forming full-color images with four color toners, the present invention is not limited thereto and may be adopted to any of full-color image forming apparatuses employing the electrophotography. The toner image of the present invention may be formed with either positively or negatively chargeable toner, may be either unicolor or multi-color toner, and may be a toner of either contact developing type or non-contact developing type.

The fixing device 32 comprises two fixing rollers. During passing the receiving medium with toner image between the fixing rollers, the toner image is fixed to the receiving medium by heat and pressure.

In case of the first printed article of the present invention, one fixing roller on a side to be in contact with the toner image may be a roller (ϕ25–50 mm) comprising a metallic core with a fluororubber coating layer of 1 mm. The hardness of the surface of the roller is from 75 to 90, preferably from 80 to 87, degree according to Asker C hardness. On the other hand, the other fixing roller may be a fixing roller (ϕ25–50 mm) comprising a metallic core with a silicone rubber coating layer of 5 mm in thickness, and a PFA tube covered onto the coating layer. The hardness of the press roller is 30 to 60 degree, preferably from 40 to 50 degree, according to Asker C hardness.

In case of the second printed article of the present invention, one fixing roller on a side to be in contact with the toner image may be a roller (ϕ20–50 mm) comprising a metallic core with a resin layer of 0.01–0.2 mm in thickness. The hardness of the surface of the roller is 80 or more, preferably 90 or more, and generally less than 99 degree according to Asker C hardness. The resin layer may be made of any of polysulfonic acid resins, polyimide resins, and polyetheretherketone resins and preferably made of fluororesin. Examples are tetrafluoroethylene-perfluoroalkoxy copolymer, tetrafluoroethylene-hexafluoropropylene copolymer, and ethylene-tetrafluoroethylene copolymer. The fluororesin layer may be a layer made by melting the fluororesin into a solvent and coating the solution on the core or a tubular film fitted onto the metallic core. On the other hand, the press roller may be a roller (ϕ25–50 mm) comprising a metallic core with a silicone rubber coating layer of 5 mm in thickness, and a PFA tube covered onto the coating layer. The hardness of the press roller is 30 to 60 degree, preferably from 45 to 55 degree, according to Asker C hardness.

Though the surface of the fixing roller to be in contact with the toner image is not needed to be lubricated with oil in either of the first printed article and the second printed article, oil may be applied to a degree not to affect the adhesive property relative to an adhesive sheet as described later.

In either of the first printed article and second printed article, the fixing conditions are temperature of 160–195° C. and nip width of 7–10 mm. The thickness of toner image formed and fixed on the receiving medium is 3–7 μm in unicolor case and 3–15 μm in multi-color case.

Figure 3:
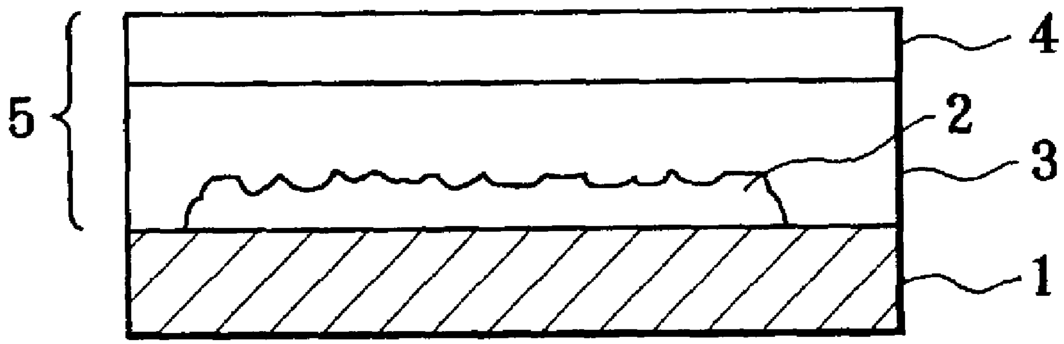
FIG. 3 is a schematic sectional view for explaining another example of the first printed article of the present invention which is produced as a high gloss printed article using a non-transparent substrate.

In the first printed article, the toner image fixed under the aforementioned fixing condition has rough surface as shown in FIG. 1 for the case of the printed article for OHP or as shown in FIG. 3 for the case of the high gloss printed article. The surface gloss level (gloss value) is 5–40, preferably 10–25. The surface of toner image fixed under the aforementioned fixing condition has a 10-Point mean roughness (Rz) of 3–10 μm, preferably 3–5 μm. The surface gloss level is obtained from values measured at an incident angle of 75 degrees, employing "GM-26D" available from Murakami Color Technology Laboratory. The surface roughness of the toner image is evaluated according to JISB0601-1982.

In the first printed article, a surface gloss level of the toner image less than 5 or Rz exceeding 10 makes the transparency too low even with an adhesive layer as described so that desired high gloss can not be exhibited. On the other hand, a surface gloss level exceeding 40 or RZ less than 3 creates "shine". When the printed article is a high gloss printed article, the shine makes image area (toner image) too glossy as compared to non-image area, so the obtained article may make something strange impression and the information can not be accurately expressed. It is inadequate because the characters should be hard to read and the colors should be hard to distinguish.

Figure 4:
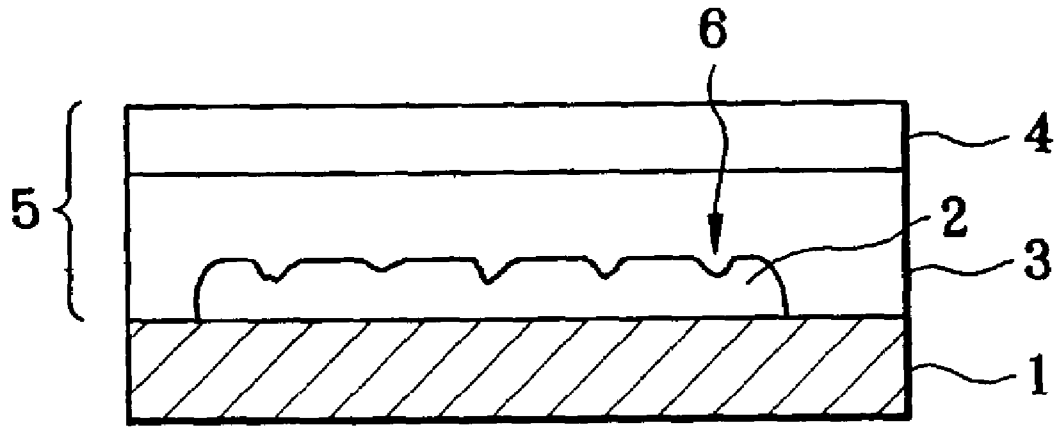
FIG. 4 is a schematic sectional view for explaining an another example of the second printed article of the present invention which is produced as a high gloss printed article using a non-transparent substrate.

In the second printed article, the toner image fixed under the aforementioned fixing condition has a lot of concavities in flat surface as shown in FIG. 2 for the case of the printed article for OHP or as shown in FIG. 4 for the case of the high gloss printed article. The surface gloss level (gloss value), as a value measured in the same manner as the above, is 25–45, preferably 25–35. The surface of toner image fixed under the aforementioned fixing condition has a 10-Point mean roughness (Rz) of 1–10 μm, preferably 3–5 μm.

The second printed article is formed using the fixing rollers having hardness of 80 or more degree according to Asker C hardness. Because of the hardness of toner image, projects of the surface of the toner image are collapsed, while concavities of the toner image remain because the roller can not touch with the concavities. Therefore, the surface of the toner image has a lot of concavities 6.

In the second printed article for OHP, a surface gloss level of the toner image less than 25 or Rz exceeding 10 makes the transparency too low even with an adhesive layer as described later. On the other hand, a surface gloss level exceeding 45 or RZ less than 1 μm creates "shine". When the printed article is a printed article for OHP and is directly seen without being projected, it is inadequate because it is too shiny to see (read).

As described above, in the first and second printed articles of the present invention, a toner image having desired surface gloss level is obtained by controlling the ratios of THF-insoluble matter and crosslinking component relative to thermoplastic resin in toner mother particles, controlling the particle size and the adding amount of gloss controlling agent, controlling the fixing condition.

Now, the first and second printed articles of the present invention are each formed by attaching a transparent adhesive sheet comprising a transparent film with an adhesive layer onto the toner image. The transparent adhesive sheet is preferably attached without using heat or pressure and may be attached automatically within the image forming apparatus. Otherwise, after the transparent substrate having toner image is discharged from the image forming apparatus, the transparent adhesive sheet may be attached not to entrap air between the sheet and the substrate by a person who will use the printed article for OHP.

The transparent film of the transparent adhesive sheet may be a polyethylene terephthalate film, polycarbonate film, polyamide imide film and has a thickness of 50–250 μm, preferably 70–180 μm.

Examples of adhesive resin include (meth)acrylate resin, ester (meth)acrylic ester resin, and copolymers of these, styrene-buthaziene copolymer, natural rubber, casein, gelatin, rosin ester, terpene resin, resins of phenol group, reins of styrene group, coumarone-indene resin, polyvinyl ether resin, silicone resin. In addition, other examples are α-cyanoacrylate adhesives, silicone adhesives, maleimide adhesives, styrol adhesives, polyolefin adhesives, resorcinol adhesives, polyvinyl ether adhesives. In case of using a silicone adhesive, the adhesive layer has air permeability. In this case, even when a small amount of air is entrapped, the air can be dispersed and discharged, thereby improving the visibility and the transparency of the projected image. The thickness of the adhesive layer is in a range from 4 μm to 30 μm. the thickness of the adhesive layer is preferably larger than the thickness of the toner image, thereby making the surface of the printed article for OHP flat without roughness and making the projected image having excellent visibility and transparency.

In the first and second printed articles of the present invention, the surface of the substrate having toner image has excellent adhesive property relative to the adhesive sheet because of the oilless fusing so that separation is not caused even for a long period of time, thus preventing reduction in transparency due to the separation. The adhesive layer covers the roughness made of wax lumps deposited on the surface of toner image to have flat surface, thereby preventing scattering of light due to the roughness of the surface of toner image and thus producing a printed article with reduced turbidity. The adhesive preferably has a refractive index achieving a difference of 0.05 or less, preferably 0.01 or less relative to the reflective index of the light-transmitting toner image.

When the first printed article of the present invention is a printed article for OHP, the difference between the reflective index of the transparent substrate, the transparent film and the reflective index of the adhesive, the toner image is 0.05 or less, preferably 0.01 or less, thereby achieving excellent visibility and transparency of projected image.

When the first printed article is a printed article for OHP, the haze value is 65–95 before attaching the adhesive sheet and 30–55 after attaching the adhesive sheet. When the second printed article is a printed article for OHP, the haze value is 60–95, preferably 60–75, in a state that the light transmitting toner image is formed on the transparent substrate and is 25–55, preferably 25–45, in a state that the adhesive sheet is attached. The haze values are measured by using "1001DP" available from Nippon Denshoku Industries Co., Ltd.

When the first printed article is a high gloss printed article, the gloss level of the toner image after attaching the adhesive sheet is 60–95 in such a manner that the difference between the gloss level of the non-image area and the gloss level of the image area is set to be lower than ±15, preferably ±10, thereby obtaining the high gloss printed article having fine image with less difference in gloss level. Because of the reduced turbidity, the color saturation of the image in the high gloss printed article is 60 or more at a solid portion as a measured value according to the spectrophotometric colorimetry by using "Spectrophoto Meter" available from GretagMacbeth GmbH. Particularly in case of color image, the image has therefore brilliant colors compared to the case without adhesive sheet attached.

When the second printed article is a high gloss printed article, the gloss level of the toner image after attaching the adhesive sheet is 60–95 in such a manner that the difference between the gloss level of the non-image area and the gloss level of the image area is set to be lower than ±15, preferably ±10, thereby obtaining the high gloss printed article having fine image with less difference in gloss level. Since the color saturation of the image in the high gloss printed article is 55 or more, preferably 60 or more. Therefore, particularly in case of color image, the image has brilliant colors compared to a case without adhesive sheet attached.

Hereinafter, the present invention will be described with reference to examples.

As for the first printed article, the case of a printed article for OHP will be described by using Example 1 through Example 3 and Comparative Example 1.

EXAMPLE 1

| | |
|---|---|
| Mixture (available from Kao Corporation, softening point: 125° C., glass-transition temperature: 65° C., weight average molecular weight: 12,000, number average molecular weight: 3,500, THF-insoluble matter: 5 wt %) which was 50:50 (by weight) of polycondensate polyester, composed of aromatic di-carboxylic acid and bisphenol A of alkylene ether, and partially crosslinking compound of the polycondensate polyester by polyvalent metal compound | 88 parts by weight |
| Phthalocyanine Blue as a cyan pigment | 5 parts by weight |
| Ester wax (melting point: 60° C., "Electhor WEC-2" available from NOF Corporation) | 4 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.925.

Subsequently, silica particles (7 nm in particle size) surface-treated by dimethylchlorosilane were added in an amount of 1 wt % and silica particles (50 nm in particle size) surface-treated in the same manner were also added in an amount of 1.5 wt % into the obtained toner particles and these were fed into the Henschel mixer (20 liters). The Henschel mixer was driven at 2850 rpm for 3 minutes so as to externally add these silica particles to the toner particles, thereby forming an oilless fusing toner of the present invention.

The obtained oilless fusing toner was loaded in an image forming apparatus as shown in FIG. 5. The image forming apparatus was a four color electrophotographic printer employing a method of superposing four color toner images onto an intermediate transfer member, a laser scan method for exposure, and a one-component jumping method for development, and of which photoreceptor was an organic photoreceptor and the intermediate transfer member had a coating layer with a function of controlling the surface resistance. As the transparent substrate, a polyethylene terephthalate film (having a thickness of 100 μm, "CG3710" available from Sumitomo 3M Ltd.) was used.

As the fixing device, a two-roller type fixing device was used. One of the two rollers was a fixing roller {ϕ40 mm, with built-in heater, roller hardness (80 degree according to Asker C)} having fluororubber coating layer of 1 mm in thickness. The other roller was a press roller {ϕ50 mm, without heater, roller hardness (40 degree according to Asker C)} comprising a core roller (3 mm in thickness) made of STKM (iron), a silicone rubber layer of 6 mm in thickness formed on the core roller, and a PFA tube (0.03 mm in thickness) as the outermost layer fitted onto the silicone rubber layer. The fixing device was arranged to dispose the fixing roller on the toner image side and the fixing was conducted under conditions: a fixing nip width of 8 mm, a fixing temperature of 175° C., a fixing speed 215 mm/s, and a fixing load of 26 kgf/cm.

Two types of toner images, i.e. a unicolor solid image (5.5 μm in thickness) and a one-line-on two-line-off halftone image (hereinafter, referred to as halftone image, 5.0 μm in thickness), were formed on the transparent substrate. The gloss level of the unicolor solid image was 22, while the gloss level of the halftone image was 12. The surface roughness (Rz) of the unicolor solid image was measured and the result was 3.3–3.8 μm. The haze values of the toner images were 75 for the unicolor solid image and 95 for the halftone image.

An adhesive sheet was attached to the transparent substrate from above the two types of toner images not to entrap air between the sheet and the substrate as shown in FIG. 1 so as to make a printed article for OHP. The adhesive sheet was formed by applying an acrylic copolymer adhesive {available from Nagoya Oilchemical Co., Ltd.} onto a transparent polyethylene terephthalate film (100 μm in thickness) to have an adhesive layer of 45 μm in thickness in the dried state.

After laminating the adhesive sheet, the haze values of the toner images were measured and the results were 43 for the unicolor solid image and 53 for the halftone image.

In addition, the transmittance (at a wavelength of 800 nm) of the printed article for OHP was measured by using a self-recording spectrophotometer "U-3500" available from Hitachi, Ltd. and the result was 88%. Further, the transmittance was measured after 15 days again and the result was 85%. This means that the high transmittance has been kept. The toner images of the printed article were easy to see (read) because of no unevenness of shin. The projected images of the toner images were also excellent both in visibility and transparency.

EXAMPLE 2

| | |
|---|---|
| Styrene-n-butylacrylate copolymer (copolymer consisting of 77% styrene and 22% n-butyl-acrylate with divinylbenzen as a crosslinking component, softening point: 120° C., glass-transition temperature: 58° C., weight average molecular weight: 80,000, number average molecular weight: 7,000, crosslinking component: 53 wt %) | 85.5 parts by weight |
| C.I. Pigment Yellow 12 | 4.5 parts by weight |
| Carnauba wax (melting point: 81° C.) weight | 7 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining yellow toner particles having a mean particle diameter of 7.5 μm and a degree of circularity of 0.920.

Subsequently, silica particles (8 nm in particle size) surface-treated by dimethylchlorosilane were added in an amount of 1.5 wt % and titanium oxide particles (50 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming an oilless fusing toner.

By using the obtained toner and the same image forming apparatus as used in Example 1, two types of toner images, i.e. a unicolor solid image (4.3 μm in thickness) and a halftone image (4.2 μm in thickness), were formed on a transparent substrate. The gloss level of the unicolor solid image was 18, while the gloss level of the halftone image was 13. The surface roughness (Rz) of the unicolor solid image was measured and the result was 3.5–4.0 μm. The haze values of the toner images were measured similarly to Example 1 and were 78 for the unicolor solid image and 88 for the halftone image.

Similarly to Example 1, an adhesive sheet was attached to the transparent substrate from above the two types of toner images so as to make a printed article for OHP. After laminating the adhesive sheet, the haze values of the toner images were measured in the same manner and the results are 48 for the unicolor solid image and 53 for the halftone image. In addition, the transmittance of the printed article for OHP was 87%. Further, the transmittance was measured after 15 days again and the result was 85%. This means that the high transmittance has been kept. The toner images of the printed article were easy to see (read) because of no unevenness of shin. The projected images of the toner images were also excellent both in visibility and transparency.

EXAMPLE 3

| | |
|---|---|
| Mixture (available from Kao Corporation, softening point: 125° C., glass-transition temperature: 63° C., weight average molecular weight: 20,000, number average molecular weight: 3,000, THF-insoluble matter: 5 wt %) which was 50:50 (by weight) of polycondensate polyester, composed of aromatic di-carboxylic acid and bisphenol A of alkylene ether, and partially crosslinking compound of the poly-condensate polyester by polyvalent metal compound | 87.5 parts by weight |
| Quinacridon (magenta) | 5.5 parts by weight |
| Ester wax (melting point: 60° C., "Electhor WEC-2" available from NOF Corporation) | 4 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining magenta toner particles having a mean particle diameter of 8 μm and a degree of circularity of 0.912.

Subsequently, silica particles (8 nm in particle size) surface-treated by dimethylchlorosilane were added in an amount of 1.5 wt %, titanium oxide particles (50 nm in particle size) were also added in an amount of 1 wt %, acrylic resin particles (0.15 μm in particle size) as a gloss controlling agent were added in an amount of 1 wt % into the obtained toner particles and these were fed into the Henschel mixer (20 liters). The Henschel mixer was driven at 2850 rpm for 3 minutes so as to externally add these particles to the toner particles, thereby forming an oilless fusing toner.

By using the obtained toner and the same image forming apparatus as used in Example 1, two types of toner images, i.e. a unicolor solid image (6.3 μm in thickness) and a halftone image (5.2 μm in thickness), were formed on a transparent substrate. The gloss level of the unicolor solid image was 20, while the gloss level of the halftone image was 12. The surface roughness (Rz) of the unicolor solid image was measured and the result was 2.8–3.8 μm. The haze values of the toner images were measured similarly to Example 1 and were 82 for the unicolor solid image and 95 for the halftone image.

The same adhesive sheet as used in Example 1 was attached to the transparent substrate from above the two types of toner images so as to make a printed article for OHP. After laminating the adhesive sheet, the haze values of the toner images were measured in the same manner and the results are 59 for the unicolor solid image and 62 for the halftone image. In addition, the transmittance of the printed article for OHP was 81%. Further, the transmittance was measured after 15 days again and the result was 81%. This means that the high transmittance has been kept. The toner images of the printed article were easy to see (read) because of no unevenness of shin. The projected images of the toner images were also excellent both in visibility and transparency.

Comparative Example 1

| | |
|---|---|
| Polycondensate polyester composed of aromatic di-carboxylic acid and bisphenol A of alkylene ether (available from Kao Corporation, softening point: 105° C., glass-transition temperature: 63° C., weight average molecular weight: 8,000, number average molecular weight: 2,500, THF-insoluble matter: 0 wt %) | 93 parts by weight |
| Phthalocyanine Blue as a cyan pigment | 5 parts by weight |
| Metal complex compound of salicylic acid E-81 (available from Orient Chemical Industries, Ltd.) | 2 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.915.

Subsequently, silica particles (8 nm in particle size) surface-treated by dimethylchlorosilane were added in an amount of 2.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming a comparative example toner.

The obtained toner was loaded in an image forming apparatus having a fixing device as follows. One of the two rollers of the fixing device was a fixing roller {ϕ40 mm, with built-in heater, roller hardness (45 degree according to Asker C)} comprising a core roller (0.8 mm in thickness) made of iron and a fluororubber coating layer (1 mm in thickness) formed on the core roller. Silicone oil of 0.03 $g/m^3$ was applied to the surface of the fluororubber coating layer. The other roller was a press roller {ϕ50 mm, without heater, roller hardness (40 degree according to Asker C)} comprising a core roller (3 mm in thickness) made of STKM (iron), a silicone rubber layer (6 mm in thickness) formed on the core roller, and a PFA tube (0.03 mm in thickness) fitted onto the silicone rubber layer. The fixing device was arranged to dispose the fixing roller on the toner image side and the fixing was conducted under conditions: a fixing nip width of 7 mm, a fixing temperature of 175° C., a fixing speed 125 mm/s, and a fixing load of 1.2 kgf/cm. The other conditions were the same as those of Example 1.

In the same manner as Example 1, two types of toner images, i.e. a unicolor solid image (4.5 μm in thickness) and a halftone image (3.8 μm in thickness), were formed on a transparent substrate. The gloss level of the unicolor solid image was 55, while the gloss level of the halftone image was 21. The surface roughness (Rz) of the unicolor solid image was measured and the result was 0.5–1.5 μm. The haze values of the toner images were measured similarly to Example 1 and were 65 for the unicolor solid image and 85 for the halftone image.

The same adhesive sheet as used in Example 1 was attached to the transparent substrate from above the two types of toner images so as to make a comparative example printed article for OHP. After laminating the adhesive sheet, the haze values of the toner images were measured in the same manner and the results are 50 for the unicolor solid image and 55 for the halftone image. In addition, the transmittance of the printed article for OHP was measured in the same manner as Example 1 and the result was 83%. After passing 15 days, the same measurement was made. As a result, floating of the toner images was entirely created due to the applied oil and the transmittance was lowered to 63%. Since shin was created, the toner images of the printed article were too shiny to see (read). The projected images of the toner images past 15 days were burred and thus were poor in visibility.

As for the second printed article, the case of a printed article for OHP will be described by using Example 4 through Example 6 and Comparative Example 2.

EXAMPLE 4

| | |
|---|---|
| Mixture (available from Kao Corporation, softening point: 125° C., glass-transition temperature: 65° C., weight average molecular weight: 12,000, number average molecular weight: 3,500, THF-insoluble matter: 5 wt %) which was 50:50 (by weight) of polycondensate polyester, composed of aromatic dicarboxylic acid and bisphenol A of alkylene ether, and partially crosslinking compound of the polycondensate polyester by polyvalent metal compound | 87 parts by weight |
| Phthalocyanine Blue as a cyan pigment | 5 parts by weight |
| Ester wax (melting point: 60° C., "Electhor WEC-2" available from NOF Corporation) | 5 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.925.

Subsequently, silica particles (7 nm in particle size) surface-treated by dimethylchlorosilane were added in an amount of 1.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming an oilless fusing toner of the invention.

The obtained oilless fusing toner was loaded in an image forming apparatus as shown in FIG. 5. The image forming apparatus was a four color electrophotographic printer employing a method of superposing four color toner images onto an intermediate transfer member, a laser scan method for exposure, and a one-component jumping method for development, and of which photoreceptor was an organic photoreceptor and the intermediate transfer member had a coating layer with a function of controlling the surface resistance. As the transparent substrate, a polyethylene terephthalate film (having a thickness of 100 μm, "CG3710" available from Sumitomo 3M Ltd.) was used.

As the fixing device, a two-roller type fixing device was used which comprised a fixing roller {with built-in heater, ϕ35 mm, roller hardness (80 degree according to Asker C)} having a core roller (0.5 mm in thickness) made of iron, a fluororubber coating layer (1 mm in thickness) formed on the core roller, and a PFA tube (30 μm in thickness) as the outermost layer fitted onto the fluororubber layer; and a press roller {ϕ40 mm, without heater, roller hardness (45 degree according to Asker C)} having a core roller (5 mm in thickness) made of iron, a silicone rubber layer of 6 mm in thickness formed on the core roller, and a PFA tube (30 μm in thickness) as the outermost layer fitted onto the silicone rubber layer. The fixing device was arranged to dispose the fixing roller on the toner image side and the fixing was conducted under conditions: a fixing nip width of 8 mm, a fixing temperature of 175° C., a fixing speed 215 mm/s, and a fixing load of 31 kgf/cm.

A unicolor solid toner image (5.5 μm in thickness) was printed on a transparent substrate. The surface of the printed image was observed by using an electron microscope (×7, 500). From this observation, it is found that there were a lot of concavities in the flat surface. The gloss level of the toner image was 35. The surface roughness (Rz) of the toner image was measured and the result was 2.5–3.3 μm. The haze value of the toner image was 65.

An adhesive sheet was attached to the transparent substrate from above the toner image not to entrap air between the sheet and the substrate as shown in FIG. 2 so as to make a printed article for OHP of the present invention. The adhesive sheet was formed by applying an urethane adhesive {available from Three Bond Co., Ltd.} onto a transparent polyethylene terephthalate film (100 μm in thickness) to have an adhesive layer of 55 μm in thickness in the dried state. After laminating the adhesive sheet, the haze value of the toner image was measured and the result was 35.

In addition, the transmittance (at a wavelength of 800 nm ) of the printed article for OHP was measured by using a self-recording spectrophotometer "U-3500" available from Hitachi, Ltd. and the result was 88%. Further, the transmittance was measured after 15 days again and the result was 87%. This means that the high transmittance has been kept. The toner image of the printed article was easy to see (read) because of no unevenness of shin. The projected image of the toner image was also excellent both in visibility and transparency.

EXAMPLE 5

Example 5 was conducted in the same manner as Example 4 except the follows. Instead of the fixing roller in the image forming apparatus of Example 4, a fixing roller {with built-in heater, ϕ30 mm, roller hardness (95 degree according to Asker C)} having a core roller (2 mm in thickness) made of aluminum and a PTFE tube (30 μm in thickness) fitted onto the core roller was used. Further, Instead of the press roller, a press roller {ϕ40 mm, without heater, roller hardness (50 degree according to Asker C)} having a core roller (3 mm in thickness) made of iron, a silicone rubber layer of 6 mm in thickness formed on the core roller, and a PFA tube (30 μm in thickness) as the outermost layer fitted onto the silicone rubber layer was used. The fixing device was arranged to dispose the fixing roller on the toner image side and the fixing was conducted under conditions: a fixing nip width of 8 mm, a fixing temperature of 175° C., a fixing speed 215 mm/s, and a fixing load of 32 kgf/cm.

A unicolor solid toner image (5.7 μm in thickness) was printed on a transparent substrate. The gloss level of the toner image was 38. The surface roughness (Rz) of the toner image was measured and the result was 2.3–4.0 μm. The haze value of the toner image was 70.

The same adhesive sheet as used in Example 4 was attached to the transparent substrate from above the toner image not to entrap air between the sheet and the substrate so as to make a printed article for OHP. After laminating the adhesive sheet, the haze value of the toner image was measured and the result was 45.

In addition, the transmittance (at a wavelength of 800 nm ) of the printed article for OHP was measured by using a self-recording spectrophotometer "U-3500" available from Hitachi, Ltd. and the result was 85%. Further, the transmittance was measured after 15 days again and the result was 86%. This means that the high transmittance has been kept. The toner image of the printed article was easy to see (read) because of no unevenness of shin. The projected image of the toner image was also excellent both in visibility and transparency.

EXAMPLE 6

Example 6 was conducted in the same manner as Example 4 except the follows. Instead of the fixing roller in the image forming apparatus of Example 4, a fixing roller {with built-in heater, 30 mm, roller hardness (91 degree according to Asker C)} having a core roller (0.5 mm in thickness) made of iron and a FLC coating layer (25 μm in thickness) formed onto the core roller was used. Further, Instead of the press roller, a press roller {ϕ40 mm, without heater, roller hardness (50 degree according to Asker C)} having a core roller (5 mm in thickness) made of iron, a silicone rubber layer of 6 mm in thickness formed on the core roller, and a PFA tube (30 μm in thickness) as the outermost layer fitted onto the silicone rubber layer was used. The fixing device was arranged to dispose the fixing roller on the toner image side and the fixing was conducted under conditions: a fixing nip width of 8 mm, a fixing temperature of 175° C., a fixing speed 215 mm/s, and a fixing load of 31 kgf/cm.

A unicolor solid toner image (8.0 μm in thickness) was printed on a transparent substrate. The gloss level of the toner image was 28. The surface roughness (Rz) of the toner image was measured and the result was 4.5–8.3 μm. The haze value of the toner image was 75.

The same adhesive sheet as used in Example 4 was attached to the transparent substrate from above the toner image not to entrap air between the sheet and the substrate so as to make a printed article for OHP of the present invention. After laminating the adhesive sheet, the haze value of the toner image was measured and the result was 50.

In addition, the transmittance (at a wavelength of 800 nm ) of the printed article for OHP was measured by using a self-recording spectrophotometer "U-3500" available from Hitachi, Ltd. and the result was 78%. Further, the transmittance was measured after 15 days again and the result was 76%. This means that the high transmittance has been kept. The toner image of the printed article was easy to see (read) because of no unevenness of shin. The projected image of the toner image was also excellent both in visibility and transparency.

Comparative Example 2

| | |
|---|---|
| Polycondensate polyester composed of aromatic di-carboxylic acid and bisphenol A of alkylene ether (available from Kao Corporation, softening point: 115° C., glass-transition temperature: 60° C., weight average molecular weight: 15,000, number average molecular weight: 3,000, THF-insoluble matter: 0 wt %) | 93 parts by weight |
| Phthalocyanine Blue as a cyan pigment | 5 parts by weight |
| Metal complex compound of salicylic acid E-81 (available from Orient Chemical Industries, Ltd.) | 2 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.915.

Subsequently, silica particles (8 nm in particle size) surface-treated by dimethylchlorosilane were added in an amount of 2.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming a comparative example toner.

Comparative Example 2 was conducted in the same manner as Example 4 except the follows. Instead of the fixing roller in the image forming apparatus of Example 4, a fixing roller {with built-in heater, ϕ35 mm, roller hardness (80 degree according to Asker C)} having a core roller (0.5 mm in thickness) made of iron, a fluororubber coating layer (1 mm in thickness) formed on the core roller, and a PFA tube (30 μm in thickness) as the outermost layer fitted onto the fluororubber layer was used. In addition, the surface of the fixing roller was lubricated with silicone oil by 0.03 $g/m^2$. Further, Instead of the press roller, a press roller {ϕ40 mm, without heater, roller hardness (45 degree according to Asker C)} having a silicone rubber layer of 6 mm in thickness formed on the core roller and a PFA tube (30 μm in thickness) fitted onto the silicone rubber layer was used. The fixing device was arranged to dispose the fixing roller on the toner image side and the fixing was conducted under conditions: a fixing nip width of 8 mm, a fixing temperature of 170° C., a fixing speed 55 mm/s, and a fixing load of 31 kgf/cm.

A unicolor solid toner image (4.5 μm in thickness) was printed on a transparent substrate similarly to Example 4. The gloss level of the toner image was 85. The surface roughness (Rz) of the toner image was measured and the result was 0.1–0.5 μm. The haze value of the toner image was measured similar to Example 4 and the result was 35.

The same adhesive sheet as used in Example 4 was attached to the transparent substrate from above the toner image so as to make a printed article for OHP. After laminating the adhesive sheet, the haze value of the toner image was measured and the result was 15. In addition, the transmittance of the printed article for OHP was measured similarly to Example 4 and the result was 92%. After passing 15 days, the same measurement was conducted. As a result, floating of the toner image was entirely created due to the applied oil and the transmittance was lowered to 53%. Since shin was created, the toner image of the printed article for OHP was too shiny to see (read). The projected image of the toner image past 15 days was blurred and thus was poor in visibility.

As for the first printed article, the case of a high gloss printed article will be described by using Example 7 and Comparative Example 3.

EXAMPLE 7

| | |
|---|---|
| Mixture (available from Kao Corporation, softening point: 125° C., glass-transition temperature: 65° C., weight average molecular weight: 12,000, number average molecular weight: 3,500, THF-insoluble matter: 5 wt %) which was 50:50 (by weight) of polycondensate polyester, composed of aromatic di-carboxylic acid and bisphenol A of alkylene ether, and partially crosslinking compound of the poly-condensate polyester by polyvalent metal compound | 88 parts by weight |
| Phthalocyanine Blue as a cyan pigment | 5 parts by weight |
| Ester wax (melting point: 60° C., “Electhor WEC-2” available from NOF Corporation) | 4 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.925.

Subsequently, silica particles (7 nm in particle size) surface-treated by dimethylchlorosilane were added in an amount of 2.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these silica particles to the toner particles, thereby forming an oilless fusing toner of the present invention.

The obtained oilless fusing toner was loaded in an image forming apparatus as shown in FIG. 5. The image forming apparatus was a four color electrophotographic printer employing a method of superposing four color toner images onto an intermediate transfer member, a laser scan method for exposure, and a one-component jumping method for development, and of which photoreceptor was an organic photoreceptor and the intermediate transfer member had a coating layer with a function of controlling the surface resistance. As the sheet of paper, “JD paper, having surface gloss level of 6.6” available from XEROX Corporation was used.

As the fixing device, a two-roller type fixing device was used. That is, one of the two rollers was a fixing roller {ϕ40 mm, with built-in heater, roller hardness (80 degree according to Asker C)} having fluororubber coating layer of 1 mm in thickness and the other roller was a press roller {ϕ50 mm, without heater, roller hardness (40 degree according to Asker C)} comprising a core roller (5 mm in thickness) made of iron, a silicone rubber layer of 6 mm in thickness formed on the core roller, and a PFA tube (30 μm in thickness) as the outermost layer fitted onto the silicone rubber layer. The fixing device was arranged to dispose the fixing roller on the toner image side and the fixing was conducted under conditions: a fixing nip width of 8 mm, a fixing temperature of 175° C., a fixing speed 215 mm/s, and a fixing load of 26 kgf/cm.

A unicolor solid toner image (5.5 μm in thickness) was printed on a sheet of paper. The gloss level of the toner image was 25. The surface roughness (Rz) of the toner image was measured and the result was 12.3–14.8 μm. The color saturation of the toner image was 50. A magenta toner was also prepared and a toner image was developed with the magenta toner instead of the cyan toner in the same manner as the cyan toner. The color saturation of this toner image was 55.

An adhesive sheet was attached to the sheet of paper from above the toner image not to entrap air therebetween as shown in FIG. 3 so as to make a high gloss printed article of the present invention. The adhesive sheet was formed by applying an acrylic copolymer adhesive {available from Nagoya Oilchemical Co., Ltd.} onto a polyethylene terephthalate film (100 μm in thickness) to have an adhesive layer of 35 μm in thickness in the dried state.

The gloss level of the obtained high gloss printed article was 95 and its color saturation was 60. This means that the high gloss printed article had a high gloss and brilliant image. In case of using the magenta toner instead of the cyan toner, the color saturation was 63. In either case, even after passing 15 days, the high gloss printed article had no separation and kept its image high gloss and brilliant.

Comparative Example 3

| | |
|---|---|
| Polycondensate polyester composed of aromatic di-carboxylic acid and bisphenol A of alkylene ether (available from Kao Corporation, softening point: 105° C., glass-transition temperature: 63° C., weight average molecular weight: 8,000, number average molecular weight: 2,500, THF-insoluble matter: 2 wt %) | 93 parts by weight |
| Phthalocyanine Blue as a cyan pigment | 5 parts by weight |
| Metal complex compound of salicylic acid E-81 (available from Orient Chemical Industries, Ltd.) | 2 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.915.

Subsequently, silica particles (8 nm in mean particle diameter) surface-treated by dimethylchlorosilane were added in an amount of 2.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming a comparative example toner.

Comparative Example 3 was conducted in the same manner as Example 7 except the follows. Instead of the fixing roller in the image forming apparatus of Example 7, a fixing roller {with built-in heater, ϕ40 mm, roller hardness (45 degree according to Asker C)} having a core roller (1.5 mm in thickness) made of iron and a fluororesin coating layer (1 mm in thickness) which was formed on the core roller was used. In addition, the surface of the fixing roller was lubricated with silicone oil by 0.03 $g/m^2$. Further, a press roller {ϕ50 mm, without heater, roller hardness (40 degree according to Asker C)} having a core roller (5 mm in thickness) made of iron, a silicone rubber layer (6 mm in thickness) formed on the core roller, and a PFA tube (30 μm in thickness) fitted onto the silicone rubber layer was used. The fixing device was arranged to dispose the fixing roller on the toner image side and the fixing was conducted under conditions: a fixing nip width of 7 mm, a fixing temperature of 175° C., a fixing speed 125 mm/s, and a fixing load of 1.2 kgf/cm.

A unicolor solid toner image (4.5 μm in thickness) was printed on a sheet of paper. The gloss level of the toner image was 55. The surface roughness (Rz) of the toner image was measured and the result was 0.5–1.5 μm. The color saturation of the toner image was 59. A magenta toner was also prepared and a toner image was developed with the magenta toner instead of the cyan toner in the same manner as the cyan toner. The color saturation of this toner image was 62.

The same adhesive sheet as used in Example 7 was attached to the sheet of paper from above the cyan toner image so as to make a high gloss printed article. After laminating the adhesive sheet, the gloss level and the color saturation of the toner image were measured and the results were 85 for gloss level and 60 for color saturation. After passing 15 days, the same measurement was made. As a result, floating of the toner image was entirely created and the color saturation was lowered to 48. This means that the image was poor in visibility. In case using the magenta toner, the color saturation of the toner image after laminating the adhesive sheet was 61. After passing 15 days, the color saturation was measured in the same manner and the result was 55. The image was poor in visibility.

As for the second printed article, the case of a high gloss printed article will be described by using Example 8 through Example 10 and Comparative Example 4.

EXAMPLE 8

| | |
|---|---|
| Mixture (available from Kao Corporation, softening point: 125° C., glass-transition temperature: 65° C., weight average molecular weight: 12,000, number average molecular weight: 3,500, THF-insoluble matter: 5 wt %) which was 50:50 (by weight) of polycondensate polyester, composed of aromatic dicarboxylic acid and bisphenol A of alkylene ether, and partially crosslinking compound of the polycondensate polyester by polyvalent metal compound | 87 parts by weight |
| Phthalocyanine Blue as a cyan pigment | 5 parts by weight |
| Ester wax (melting point: 60° C., "Electhor WEC-2" available from NOF Corporation) | 5 parts by weight |
| Metal complex compound of salicylic acid E-81 (available from Orient Chemical Industries, Ltd.) | 3 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.925.

Subsequently, silica particles (7 nm in particle size) surface-treated by dimethylchlorosilane were added in an amount of 1.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these silica particles to the toner particles, thereby forming an oilless fusing toner of the present invention.

The obtained oilless fusing toner was loaded in an image forming apparatus as shown in FIG. 5. The image forming apparatus was a four color electrophotographic printer employing a method of superposing four color toner images onto an intermediate transfer member, a laser scan method for exposure, and a one-component jumping method for development, and of which photoreceptor was an organic photoreceptor and the intermediate transfer member had a coating layer with a function of controlling the surface resistance. As the sheet of paper, "JD paper, having surface gloss level of 6.6" available from XEROX Corporation was used.

As the fixing device, a two-roller type fixing device was used of which fixing roller is a roller {with built-in heater, ϕ35 mm, roller hardness (80 degree according to Asker C)} having a core roller (0.5 mm in thickness) made of iron, a fluororubber coating layer (1 mm in thickness) formed on the core roller, and a PFA tube (30 μm in thickness) as the outermost layer fitted onto the fluororubber layer; and the press roller is a roller {ϕ40 mm, without heater, roller hardness (45 degree according to Asker C)} having a core roller (5 mm in thickness) made of iron, a silicone rubber layer of 6 mm in thickness formed on the core roller, and a PFA tube (30 μm in thickness) as the outermost layer fitted onto the silicone rubber layer. The fixing device was arranged to dispose the fixing roller on the toner image side and the fixing was conducted under conditions: a fixing nip width of 8 mm, a fixing temperature of 175° C., a fixing speed 215 mm/s, and a fixing load of 31 kgf/cm.

A unicolor solid toner image (5.5 μm in thickness) was printed on a sheet of paper. The surface of the printed image was observed by using an electron microscope (×7,500). From this observation, it is found that there were a lot of concavities in the flat surface. The gloss level of the toner image was 30. The surface roughness (Rz) of the toner image was measured and the result was 12.5–14.3 μm. The color saturation of the toner image was 45. A magenta toner was also prepared and a toner image was developed with the magenta toner instead of the cyan toner in the same manner as the cyan toner. The color saturation of this toner image was 50.

An adhesive sheet was attached to the sheet of paper from above the toner image not to entrap air therebetween as shown in FIG. 4 so as to make a high to gloss printed article of the present invention. The adhesive sheet was formed by applying a polyurethane adhesive {available from Three Bond Co., Ltd.} onto a transparent polyethylene terephthalate film (100 μm in thickness) to have an adhesive layer of 55 μm in thickness in the dried state.

The gloss level of the obtained high gloss printed article was 95 and its color saturation was 61. This means that the high gloss printed article had a high gloss and brilliant image. Even after passing 15 days, the high gloss printed article had no separation and kept its image high gloss and brilliant. In case of using the magenta toner instead of the cyan toner, the color saturation was 63.

EXAMPLE 9

Example 9 was conducted in the same manner as Example 8 except the follows. Instead of the fixing roller in the image forming apparatus of Example 8, a fixing roller {with built-in heater, φ30 mm, roller hardness (95 degree according to Asker C)} having a core roller (2 mm in thickness) made of aluminum and a PTFE tube (30 μm in thickness) fitted onto the core roller was used. Further, Instead of the press roller, a press roller {φ35 mm, without heater, roller hardness (50 degree according to Asker C)} having a core roller (3 mm in thickness) made of iron, a silicone rubber layer of 6 mm in thickness formed on the core roller, and a PFA tube (30 μm in thickness) as the outermost layer fitted onto the silicone rubber layer was used. The fixing device was arranged to dispose the fixing roller on the toner image side and the fixing was conducted under conditions: a fixing nip width of 8 mm, a fixing temperature of 175° C., a fixing speed 215 mm/s, and a fixing load of 32 kgf/cm.

A unicolor solid toner image (6.1 μm in thickness) was printed on a sheet of paper. The gloss level of the toner image was 28. The surface roughness (Rz) of the toner image was measured and the result was 2.3–5.5 μm. The color saturation of the toner image was 48. A magenta toner was also prepared and a toner image was developed with the magenta toner instead of the cyan toner in the same manner as the cyan toner. The color saturation of this toner image was 50.

An adhesive sheet was attached to the sheet of paper from above the toner image not to entrap air therebetween as shown in FIG. 4 so as to make a high gloss printed article of the present invention. The adhesive sheet was formed by applying a polyurethane adhesive {available from Three Bond Co., Ltd.} onto a transparent polyethylene terephthalate film (100 μm in thickness) to have an adhesive layer of 30 μm in thickness in the dried state.

The gloss level of the obtained high gloss printed article was 90 and its color saturation was 65. This means that the high gloss printed article had a high gloss and brilliant image. Even after passing 15 days, the high gloss printed article had no separation and kept its image high gloss and brilliant. In case of using the magenta toner instead of the cyan toner, the color saturation was 68.

EXAMPLE 10

Example 10 was conducted in the same manner as Example 8 except the follows. Instead of the fixing roller in the image forming apparatus of Example 8, a fixing roller {with built-in heater, φ30 mm, roller hardness (93 degree according to Asker C)} having a core roller (0.5 mm in thickness) made of iron and a FLC coating layer (25 μm in thickness) formed onto the core roller was used. Further, Instead of the press roller, a press roller {(35 mm, without heater, roller hardness (45 degree according to Asker C)} having a core roller (5 mm in thickness) made of iron, a silicone rubber layer of 6 mm in thickness formed on the core roller, and a PFA tube (30 μm in thickness) fitted onto the silicone rubber layer was used. The fixing device was arranged to dispose the fixing roller on the toner image side and the fixing was conducted under conditions: a fixing nip width of 8 mm, a fixing temperature of 175° C., a fixing speed 215 mm/s, and a fixing load of 31 kgf/cm.

A unicolor solid toner image (5.3 μm in thickness) was printed on a sheet of paper similarly to Example 8. The gloss level of the toner image was 32. The surface roughness (Rz) of the toner image was measured and the result was 1.5–3.8 μm. The color saturation of the toner image was 50. A magenta toner was also prepared and a toner image was developed with the magenta toner instead of the cyan toner in the same manner as the cyan toner. The color saturation of this toner image was 52.

An adhesive sheet was attached to the sheet of paper from above the toner image not to entrap air therebetween as shown in FIG. 4 so as to make a high gloss printed article of the present invention. The adhesive sheet was formed by applying a polyurethane adhesive {available from Three Bond Co., Ltd.} onto a transparent polyethylene terephthalate film (100 μm in thickness) to have an adhesive layer of 20 μm in thickness in the dried state.

The gloss level of the obtained high gloss printed article was 84 and its color saturation was 65. This means that the high gloss printed article had a high gloss and brilliant image. Even after passing 15 days, the high gloss printed article had no separation and kept its image high gloss and brilliant. In case of using the magenta toner instead of the cyan toner, the color saturation was 65.

Comparative Example 4

| | |
|---|---|
| Polycondensate polyester composed of aromatic di-carboxylic acid and bisphenol A of alkylene ether (available from Kao Corporation, softening point: 115° C., glass-transition temperature: 63° C., weight average molecular weight: 11,000, number average molecular weight: 3,300, THF-insoluble matter: 5 wt %) | 93 parts by weight |
| Phthalocyanine Blue as a cyan pigment | 5 parts by weight |
| Metal complex compound of salicylic acid E-81 (available from Orient Chemical Industries, Ltd.) | 2 parts by weight |

These were uniformly mixed by using a Henschel mixer, kneaded by a twin-shaft extruder with an internal temperature of 150° C., and then cooled. The cooled substance was roughly pulverized into pieces of 2 square mm or less and then pulverized into fine particles by a turbo mill. The fine particles were classified by a rotary classifier, thereby obtaining cyan toner particles having a mean particle diameter of 7.5 μm and a degree of circularity of 0.915.

Subsequently, silica particles (8 nm in mean particle diameter) surface-treated by dimethylchlorosilane were added in an amount of 2.5 wt % and titanium oxide particles (10 nm in particle size) were also added in an amount of 1 wt % into the obtained toner particles and these were fed into the Henschel mixer (20 liters). The Henschel mixer was driven at 2850 rpm for 3 minutes so as to externally add these particles to the toner particles, thereby forming a comparative example toner.

Comparative Example 4 was conducted in the same manner as Example 8 except the follows. Instead of the fixing roller in the image forming apparatus of Example 8, a fixing roller {with built-in heater, φ35 mm, roller hardness (85 degree according to Asker C)} having a core roller (0.5 mm in thickness) made of iron, a fluororesin coating layer (1 mm in thickness) which was formed on the core roller, and a PFA tube (30 μm in thickness) as the outermost layer fitted onto the fluororesin coating layer was used. A press roller {(40 mm, without heater, roller hardness (45 degree according to Asker C)} having a core roller (5 mm in thickness) made of iron, a silicone rubber layer of 6 mm in thickness formed on the core roller, and a PFA tube (30 μm in thickness) fitted onto the silicone rubber layer was used. The fixing device was arranged to dispose the fixing roller on the toner image side and the fixing was conducted under conditions: a fixing nip width of 7 mm, a fixing temperature of 175° C., a fixing speed 150 mm/s, and a fixing load of 31 kgf/cm.

A unicolor solid toner image (4.5 μm in thickness) was printed on a sheet of paper similarly to Example 8. The gloss level of the toner image was 68 and its color saturation was 60. The surface roughness (Rz) of the toner image was measured and the result was 0.2–0.8 μm. A magenta toner was also prepared and a toner image was developed with the magenta toner instead of the cyan toner in the same manner as the cyan toner. The color saturation of this toner image was 58.

The same adhesive sheet as used in Example 8 was attached to the sheet of paper from above the cyan toner image so as to make a high gloss printed article. After laminating the adhesive sheet, the gloss level of the toner image was 87 and its color saturation was 66. After passing 15 days, the same measurement was made. As a result, floating of the toner image was entirely created and the gloss level was lowered to 75% and the color saturation was lowered to 50. This means that the image was poor in visibility. In case using the magenta toner, the color saturation of the toner image was 65 after laminating the adhesive sheet and 52 after passing 15 days.

What we claim is:

1. A printed article for an overhead projector comprising:

a transparent substrate;

a toner image which is made of a thermoplastic resin containing a wax component in an amount of 3 to 15 wt %, has a surface gloss level from 5 to 40, and is formed on the transparent substrate by oilless fusing, wherein the thermoplastic resin of the toner image is polyester resin which contains THF-insoluble matter in an amount of 2 to 40 wt %; and a transparent film which is laminated to the surface of the substrate, on which the toner image is formed, via an adhesive layer; and wherein a difference between the refractive index of the adhesive and the refractive index of the transparent substrate is 0.05 or less, and the transparent film and the refractive index of the adhesive and the toner image is 0.05 or less.

2. A printed article for and overhead projector comprising:

a transparent substrate;

a toner image which is made of a thermoplastic resin containing a wax component in an amount of 3 to 15 wt %, has a surface gloss level from 5 to 40, and is formed on the transparent substrate by oilless fusing, wherein the thermoplastic resin of the toner image is a styrene-(meth)acryl copolymer resin which contains a crosslinking component in an amount of 40 to 60 wt %; and a transparent film which is laminated to the surface of the substrate, on which the toner image is formed, via an adhesive layer; and wherein a difference between the refractive index of the adhesive and the refractive index of the toner image is 0.05 or less, and a difference between the refractive index of the transparent substrate and the transparent film and the refractive index of the adhesive and the toner image is 0.05 or less.

3. A printed article for OHP comprising:

a transparent substrate;

a toner image which is made of a thermoplastic resin containing a wax component in an amount from 3 to 15 wt % and is formed on the substrate by oilless fusing to have a surface gloss level from 5 to 40, wherein toner particles forming the toner image are composed of toner mother particles and external additive particles and the external additive particles are added to the toner mother particles by a ratio of 2 to 7 wt %; and a transparent film which is laminated to the surface of the substrate, on which the toner image is formed, via an adhesive layer; and wherein a difference between the refractive index of the adhesive and the refractive index of the toner image is 0.05 or less, and a difference between the refractive index of the transparent substrate and the transparent film and the refractive index of the adhesive and the toner image is 0.05 or less.

4. A printed article for an overhead projector as claimed in any one of claims 1, 2 and 3, wherein the 10-Point mean roughness (Rz) according to JISBO601-1982 of the surface of the toner image is in a range from 1 to 10 μm.

5. A printed article as claimed in any one of claims 1–3, wherein the printed article is a high gloss printed article.

6. A printed article for an overhead projector, comprising:

a transparent substrate;

a toner image which is made of a thermoplastic resin containing a wax component in an amount of from 3 to 15 wt %, is formed on the transparent substrate by oilless fusing to have a surface gloss level from 25 to 45, and has a flat surface with a lot of concavities, wherein the thermoplastic resin of the toner image is polyester resin which contains THF-insoluble matter in an amount from 2 to 40 wt %; and a transparent film which is laminated to the surface of the transparent substrate, on which the toner image is formed, via an adhesive layer, wherein the thickness of the adhesive layer is larger than the thickness of the toner image, and wherein a difference between the refractive index of the adhesive and the refractive index of the transparent substrate is 0.05 or less, and the transparent film and the refractive index of the adhesive and the toner image is 0.05 or less.

7. A printed article comprising:

a transparent substrate;

a toner image which is made of a thermoplastic resin containing a wax component in an amount of from 3 to 15 wt %, is formed on the transparent substrate by oilless fusing to have a surface gloss level from 25 to 45, and has a flat surface with a lot of concavities, wherein the thermoplastic resin of the toner image is styrene-(meth)acryl copolymer resin which contains a crosslinking component in an amount from 40 to 60 wt %; and a transparent film which is laminated to the surface of the transparent substrate, on which the toner image is formed, via an adhesive layer, wherein a difference between the refractive index of the adhesive and the refractive index of the transparent substrate is 0.05 or less, and the transparent film and the refractive index of the adhesive and the toner image is 0.05 or less.

8. A printed article comprising: a transparent substrate;

a toner image which is made of a thermoplastic resin containing a wax component in an amount of from 3 to 15 wt %, is formed on the substrate by oilless fusing to have a surface gloss level from 25 to 45, and has a flat surface with a lot of concavities, wherein toner particles forming the toner image are composed of toner mother particles and external additive particles and the external additive particles are added to the toner mother particles by a ratio from 2 to 7 wt %; and a transparent film which is laminated to the surface of the substrate, on which the toner image is formed, via an adhesive layer, wherein a difference between the refractive index of the adhesive and the refractive index of the transparent substrate is 0.05 or less, and the transparent film and the refractive index of the adhesive and the toner image is 0.05 or less.

9. A printed article as claimed in any one of claims 1–3 or 7–8, wherein the thickness of the adhesive layer is larger than the thickness of the toner image.

10. A printed article as claimed in any one of claims 6–8, wherein the substrate is a transparent substrate, the toner image is a toner image having a light transmitting property, and the printed article is a printed article for OHP.

11. A printed article as claimed in any one of claims 6–8, wherein the substrate is a non-transparent sheet, the toner image is a toner image having light transmitting property, and the printed article is a high gloss printed article.

12. The printed article as claimed in any one of claims 6, 7, and 8, wherein the 10-Point mean roughness (Rz) according to JISB0601-1982 of the surface of the toner image is in a range of from 1 to 10 μm.

* * * * *